Oct. 18, 1932.  S. B. HASELTINE  1,882,840
FRICTION SHOCK ABSORBING MECHANISM
Filed Feb. 14, 1924    2 Sheets-Sheet 1
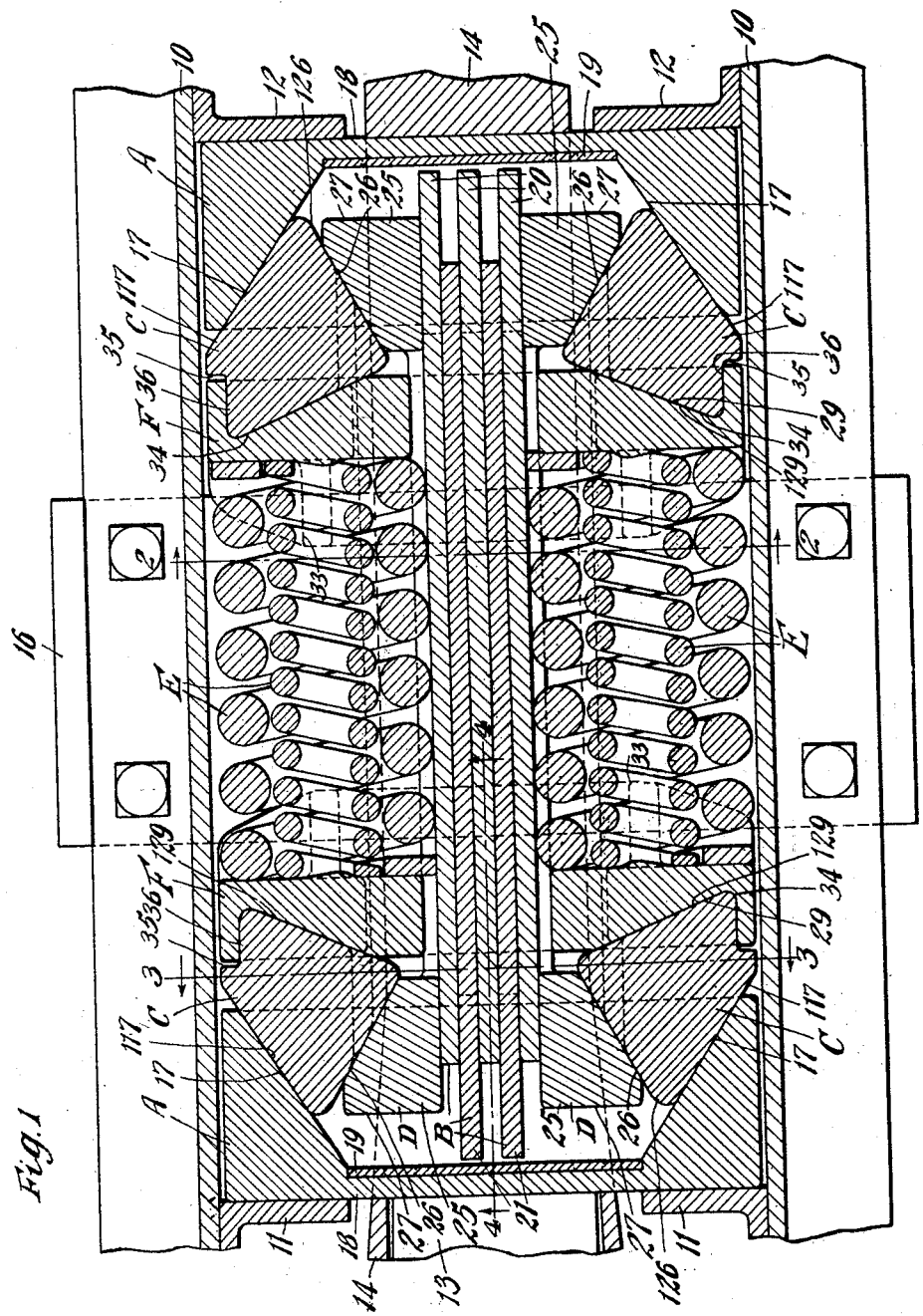
Witnesses
Wm. Geiger
Inventor
Stacy B. Haseltine
By George I. Haight
Atty.

Oct. 18, 1932.  S. B. HASELTINE  1,882,840
FRICTION SHOCK ABSORBING MECHANISM
Filed Feb. 14, 1924  2 Sheets-Sheet 2
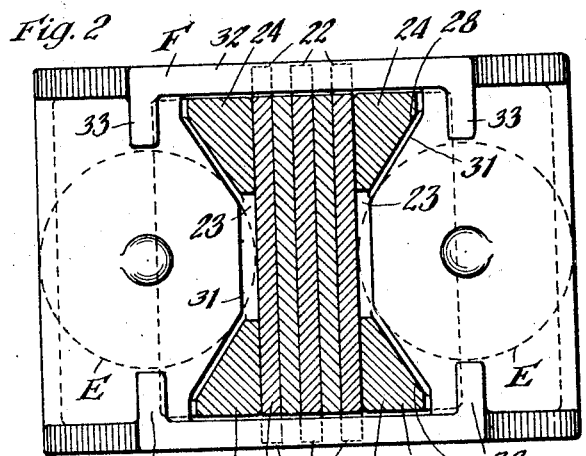
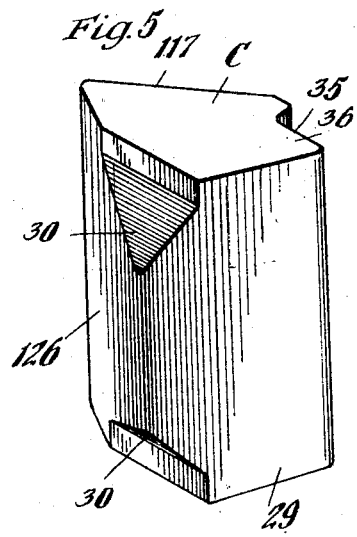
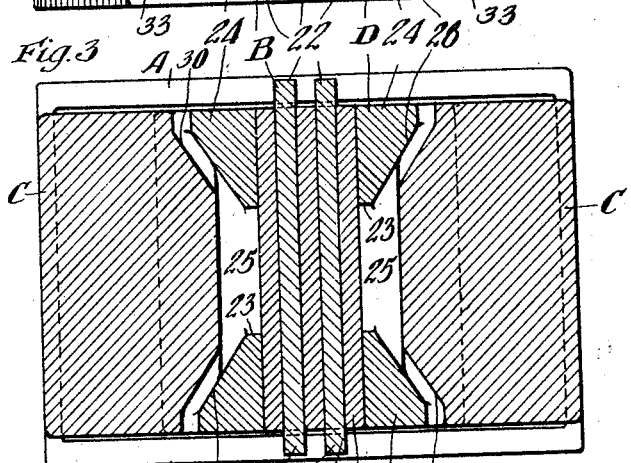
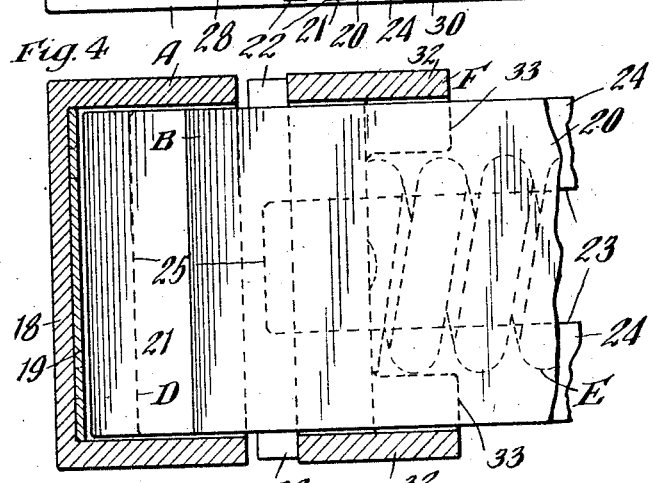
Witnesses
Wm. Geiger
Inventor
Stacy B. Haseltine
By George J. Naught
His Atty.

Patented Oct. 18, 1932

1,882,840

UNITED STATES PATENT OFFICE

STACY B. HASELTINE, OF CHICAGO, ILLINOIS, ASSIGNOR, BY MESNE ASSIGNMENTS, TO W. H. MINER, INC., A CORPORATION OF DELAWARE

FRICTION SHOCK ABSORBING MECHANISM

Application filed February 14, 1924. Serial No. 692,684.

This invention relates to improvements in friction shock absorbing mechanisms.

One object of the invention is to provide a friction shock absorbing mechanism, especially adapted for railway draft riggings, wherein is obtained high capacity due to large frictional areas, and certain release.

A more specific object of the invention is to provide a shock absorbing mechanism, including a plurality of intercalated friction plates, wherein a wedge pressure system including yoke acting means cooperating with the friction plates is employed to place the same under pressure.

Other objects and advantages of the invention will more clearly appear from the description and claims hereinafter following.

In the drawings forming a part of this specification, Figure 1 is a horizontal, longitudinal, sectional view of a portion of a railway draft rigging, showing my improvements in connection therewith. Figures 2 and 3 are vertical, transverse, sectional views corresponding respectively to the lines 2—2 and 3—3 of Figure 1. Figure 4 is a vertical, longitudinal, sectional view corresponding substantially to the line 4—4 of Figure 1. And Figure 5 is a detailed, perspective view of a wedge block used in connection with my improved mechanism.

In said drawings, 10—10 denote channel shaped center or draft sills of a railway car underframe, to the inner faces of which are secured front stop lugs 11 and rear stop lugs 12 arranged in the usual manner. A portion of the drawbar is indicated at 13, to which is secured a hooded yoke 14. The shock absorbing mechanism proper, hereinafter described, is disposed within the yoke and all the movable parts of the draft rigging are supported by a detachable saddle plate 16.

The improved shock absorbing mechanism proper, as shown, comprises, broadly, a pair of front and rear followers A—A; a central group of friction plates B; four end wedges C—C; a pair of auxiliary yokes D—D; twin arranged spring resistance elements E—E; and front and rear spring followers F—F.

The front and rear followers are of like construction, each being of hollow, rectangular form and having internal, opposed wedge faces 17—17 diverging inwardly or toward the center of the mechanism. Each follower is also provided with a transverse flat outer face 18 adapted to coact with the corresponding stop lugs in the usual manner. Between the wedge faces, the inner surface of the end wall of each follower is preferably protected by a wear plate 19.

The group of friction plates B is longitudinally disposed between the followers A, centrally of the mechanism and consists of three plates 20 and two plates 21, the plates 20 and 21 being alternated with two of the plates 20 arranged outermost and in contact with the inner sides of the respective yokes D. The plates 20 and 21 are of like construction, each being provided with upper and lower short lugs 22 near one end thereof, for a purpose hereinafter described. As clearly shown in Figures 1 and 4, the plates 20 and 21 are reversely arranged, the plates 20 having their lug carrying ends disposed at the rear end, and the plates 21 having the lug carrying ends disposed at the front end of the mechanism. The rear ends of the plates 20 are normally slightly spaced from the end wall of the rear follower and project beyond the corresponding ends of the plates 21, and the front ends of the plates 21 are normally slightly spaced from the end wall of the front follower and project beyond the corresponding ends of the plates 20. The plates 20 and 21 are preferably equal in length to the yokes D, for a purpose hereinafter described.

The yokes D, which are of like construction are disposed on opposite sides of the group of friction plates B and have flat bearing contact with the cooperating plates 20, as hereinbefore stated. Each yoke D is in the form of a relative heavy casting having a central opening 23 defined by upper and lower longitudinally disposed arms 24—24 and vertically disposed end sections 25—25. At the outer side of each yoke, the front and rear end sections are each provided with a wedge face 26, the wedge faces 26 at the corresponding ends of the two yokes converging inwardly or toward the center of the mechanism. Each yoke D is formed with front and rear flat, transverse, end faces 27 adapted to abut the respective followers A when the mechanism is fully compressed. At the outer side of each yoke, the top and bottom arms 24 are cut away at the lower and upper corners, respectively, as indicated at 28 to accommodate the side of the corresponding spring resistance element E.

The four wedges C—C, which are of like construction, are arranged in pairs at opposite ends of the mechanism, one pair coacting with the front follower and the other with the rear follower. Each wedge C is in the form of a block having a transversely inclined flat face 29 at the inner end coacting with the corresponding spring follower F, and a pair of outwardly converging wedge faces 117 and 126 at the outer end correspondingly inclined to and adapted to coact respectively with the adjacent wedge faces 17 and 26 of the corresponding main follower and auxiliary yoke. At the inner side of each block C, the upper and lower edges are cut away as indicated at 30 to clear the upper and lower portions of the corresponding yoke D.

The front and rear spring followers F—F are of like construction, each being in the form of a relatively heavy rectangular plate, having a central opening 31 adapted to slidingly receive the corresponding end portions of the group of friction plates B and pair of yokes D. At the inner side, each follower E is provided with horizontally disposed top and bottom flanges 32 formed integral therewith. Each of the flanges 32 is provided with a pair of longitudinally extending spaced parallel ribs 33, the ribs of each flange being disposed on opposite sides of the yokes D and the ribs on the top and bottom flanges of the follower being on corresponding sides of the follower being in alinement and projecting toward each other. Each set of opposed ribs of the top and bottom flanges are so spaced as to embrace the corresponding spring resistance elements E at diametrically opposite points thereof, thereby retaining the same in properly centered position. A pair of pockets 34—34 are provided at the outer side of each follower, the pockets being disposed at opposite sides of the mechanism, and each pocket being adapted to receive and form a seat for the inner end of the corresponding wedge block C. The inner end of each wedge block is cut away as indicated at 35 to properly fit the pocket and provide an abutment shoulder 36 adapted to engage the side wall of the pocket to limit the lateral outward movement of the wedge block, by which means all parts except the end followers A are held in proper assembled relation and a desired amount of initial compression on the springs is maintained. Each pocket has a flat vertical face 129 extending transversely of the mechanism, correspondingly inclined to and coacting with the inclined face 29 of the corresponding wedge block C. As clearly shown in Figure 4, the opposed ends of both sets of plates 20 and 21 of the group B extend entirely through the follower F and the lugs 22 of the plates 21 are adapted to be engaged by the outer end of the front spring follower F, while the lugs 22 of the plates 20 are adapted to be engaged by the rear end of the rear spring follower.

The spring resistance elements E—E are disposed in twin arrangement, one being located on each side of the central group of plates B. Each spring resistance element comprises a relatively large outer coil and a smaller inner coil, having their opposite ends bearing respectively on the front and rear spring followers F, each spring follower being preferably provided with a pair of centering bosses respectively engaging within the inner coils of the spring resistance elements.

In the operation of my improved shock absorbing mechanism, assuming that the front follower A is being moved rearwardly toward the rear follower during buff, a wedging action will be set up between the followers A, wedges C and yokes D, at both ends of the mechanism, thereby placing the group of central plates D under compression and augmenting the frictional resistance between the plates. During the further inward movement of the follower, the blocks C at the front end of the mechanism will be forced inwardly against the resistance of the springs E, longitudinally toward the center and laterally toward the axis of the mechanism, while the blocks C at the rear end of the mechanism will be forced rearwardly longitudinally of the mechanism, and laterally toward each other, the respective faces 117, 126 and 29 of the shoes slipping on the faces 17, 26 and 129 of the followers A, yokes D and spring followers F. As the front follower A moves inwardly, the same will approach the front ends of the plates 21 and the rear ends of the plates 20 will gradually approach the rear follower A, until the same are engaged by the respective followers and moved relatively to each other. Although the yokes D are floating, the outermost plates 20 also have relative sliding movement thereon during compression of the mechanism. It will be evident that, during the operation just described, the ends of the yokes act in the manner of wedges relatively fixed with reference to each other. During the initial compression of the mechanism and before the main followers come into engagement with the ends of the plates, the front and rear spring followers will be moved out of engagement with the lugs 22 of the respective plates, thereby facilitating the releasing action of the mechanism. The described relative movement of the plates and the differential action of the wedge blocks will continue until the gear is fully compressed, at which time the followers A engage the opposite ends of the yokes D, and the friction plates B, limiting their relative movement, the forces being thereafter transmitted directly through the pair of yokes, and the plates, which together function as a column load-sustaining means. It will also be evident that friction will be created between the various wedge faces in addition to that created between the intercalated friction plates. During draft, the action is the reverse of that just described, the front follower remaining stationary, while the rear follower is moved toward the same.

Upon removal of the actuating pressure, the main followers will drop away from the wedge blocks C, thereby reducing the pressure on the friction plates prior to any relative movement of the same. After the wedge pressure has been relieved, the front and rear spring followers, impelled by the expansive action of the springs will engage the lugs 22 of the plates 21 and 20 respectively, thereby drawing the plates in opposite directions longitudinally of the mechanism, and returning the same to their normal position with the front and rear ends thereof slightly spaced from the respective main followers.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with relatively movable end followers, each having wedge means held against relative lateral movement associated therewith; of a group of relatively movable friction plates interposed between said followers; means for placing the group of plates under lateral pressure including wedge blocks and a yoke, said blocks and yoke being also interposed between said end followers; and means for yieldingly resisting relative movement of said wedge blocks.

2. In a friction shock absorbing mechanism, the combination with relatively movable end followers; of a plurality of relatively movable friction plates interposed between said end followers; a spring resistance; and wedging means having wedging engagement with said followers for placing said plates under pressure, said wedging means including a yoke interposed between said followers.

3. In a friction shock absorbing mechanism, the combination with a plurality of relatively movable, intercalated friction plates; end followers coacting with said plates; a pair of yokes disposed on opposite sides of said plates, said yokes being adapted to limit the relative approach of said followers; wedge means having wedging engagement with the followers and yokes; and a spring resistance coacting with said wedge means.

4. In a friction shock absorbing mechanism, including a drawbar and a yoke, the combination with a pair of auxiliary yokes mounted within and extending longitudinally of said first named yoke; of a plurality of intercalated friction plates interposed between said auxiliary yokes; movement resisting mechanism coacting with and supported by said first named yoke and supporting said auxiliary yokes independently thereof, said movement resisting means including wedge members coacting with the opposite ends of said auxiliary yokes.

5. In a friction shock absorbing mechanism, the combination with relatively movable front and rear wedge pressure transmitting means; of a pair of yokes interposed between said front and rear wedge pressure transmitting means; a plurality of relatively movable, intercalated friction plates interposed between said yokes; a plurality of wedge members coacting respectively with said yokes and wedge pressure transmitting means, said members being relatively movable toward each other longitudinally of the mechanism; and means for yieldingly resisting relative approach of said members.

6. In a friction shock absorbing mechanism, the combination with relatively movable end followers; of a pair of yoke elements between said followers; spring resistance means disposed within said yoke elements; a plurality of wedge members said members co-operating with the opposite ends of the spring resistance means; and wedging means on said yokes and followers coacting with said wedge members to effect lateral approach of the latter and force the same toward each other longitudinally of the mechanism.

7. In a friction shock absorbing mechanism, the combination with relatively movable front and rear wedge pressure transmitting elements; of a pair of longitudinally disposed yokes between said elements, said yokes being of a length to limit the relative approach of the elements; a plurality of relatively movable friction plates between said elements, said plates being disposed between said yokes and adapted to be moved relatively upon approach of said elements; wedge means engaging said yokes and elements; and a spring resistance co-operating with said wedge means and yieldingly opposing movement thereof.

8. In a friction shock absorbing mechanism, the combination with relatively movable end followers; of lateral wedge pressure transmitting means movable with the followers a pair of longitudinally disposed yokes between said followers, said yokes being of a length to limit the relative approach of the followers; a plurality of relatively movable intercalated friction plates disposed longitudinally of the mechanism and interposed between the followers, said plates being actuated by said followers upon approach of the latter to effect relative movement of the plates, said plates and yokes being of equal length and adapted to be simultaneously engaged by said followers and act as column-load-sustaining means when the mechanism is fully compressed; wedge means engaging said yokes and followers; and a spring resistance opposing movement of said wedge means.

9. In a friction shock absorbing mechanism, the combination with relatively movable end followers; of a pair of yoke elements, spring resistance means disposed within said yoke elements; a pair of spring followers; a plurality of wedge members; and wedging means on said yokes, end followers and spring followers, said wedging means coacting with said wedge members to effect lateral approach of the latter and force the same toward each other longitudinally of the mechanism.

10. In a friction shock absorbing mechanism, the combination with relatively movable end followers; of wedge acting yoke means interposed between said followers; a spring resistance disposed within said yoke means; a pair of spring followers having wedge means thereon; a plurality of wedge members coacting with said yoke means, end and spring followers to effect lateral approach of said wedge members and force the same toward each other longitudinally of the mechanism; and abutment means on said spring followers adapted to limit the lateral separation of said wedge members.

11. In a friction shock absorbing mechanism, the combination with a plurality of relatively movable, intercalated friction plates; end followers coacting with said plates said followers having wedge means movable therewith, a pair of yokes disposed on opposite sides of said plates; wedge elements coacting with said wedge means and yokes; a spring resistance coacting with said wedge elements; and coacting means on said plates and followers for restoring the plates to normal position.

12. In a friction shock absorbing mechanism, the combination with a plurality of relatively movable, intercalated friction plates; of a pair of relatively movable main follower shells, each having inclined interior friction surfaces thereon; a pair of lateral pressure transmitting elements coacting with said plates, said elements each having a pair of wedge faces thereon; spring resistance means; a pair of spring followers; and a plurality of wedge blocks, each having a wedge face coacting with one of said wedge faces of one of said elements and a pair of friction surfaces coacting respectively with the outer surface of one of said spring followers and one of said inclined surfaces of one of said main follower shells.

In witness that I claim the foregoing I have hereunto subscribed my name this 9th day of February 1924.

STACY B. HASELTINE.